(12) United States Patent
Allen et al.

(10) Patent No.: US 11,146,557 B2
(45) Date of Patent: Oct. 12, 2021

(54) AUGMENTED REALITY SERVICE NEGOTIATION

(71) Applicants: Vulcan Inc., Seattle, WA (US); Jo Lynn Allen

(72) Inventors: Paul G. Allen, Mercer Island, WA (US); Alan Caplan, Seattle, WA (US); Keith Rosema, Seattle, WA (US); Jeffrey Alex Kramer, Redmond, WA (US)

(73) Assignee: Vulcan Inc., Seattle, WA (US)

( * ) Notice: Subject to any disclaimer, the term of this patent is extended or adjusted under 35 U.S.C. 154(b) by 315 days.

(21) Appl. No.: 16/389,609

(22) Filed: Apr. 19, 2019

(65) Prior Publication Data

US 2020/0028849 A1 Jan. 23, 2020

Related U.S. Application Data

(60) Provisional application No. 62/660,891, filed on Apr. 20, 2018.

(51) Int. Cl.
*H04L 29/06* (2006.01)
*G06T 19/00* (2011.01)
*H04L 29/08* (2006.01)

(52) U.S. Cl.
CPC ........ *H04L 63/0884* (2013.01); *G06T 19/006* (2013.01); *H04L 63/107* (2013.01); *H04L 67/18* (2013.01); *H04L 67/322* (2013.01); *H04L 67/38* (2013.01); *H04L 69/24* (2013.01)

(58) Field of Classification Search
CPC ... H04L 63/0884; H04L 67/18; H04L 67/322; H04L 67/38; H04L 69/24; H04L 63/107; H04L 9/3273; H04L 9/3218; H04L 63/205; G06T 19/006; H04W 12/63; H04W 12/08; H04W 12/06
See application file for complete search history.

(56) References Cited

U.S. PATENT DOCUMENTS

| 8,929,915 | B2 | 1/2015 | Stewart | |
|---|---|---|---|---|
| 10,355,788 | B2 | 7/2019 | Cirit | |
| 2009/0150672 | A1* | 6/2009 | Kwon | H04L 9/321 |
| | | | | 713/169 |
| 2012/0167189 | A1* | 6/2012 | Aichroth | H04L 9/006 |
| | | | | 726/7 |
| 2014/0125574 | A1* | 5/2014 | Scavezze | H04W 12/06 |
| | | | | 345/156 |
| 2014/0244723 | A1* | 8/2014 | Gong | H04L 63/164 |
| | | | | 709/203 |
| 2015/0288521 | A1* | 10/2015 | Nahari | H04L 63/0853 |
| | | | | 713/170 |

(Continued)

*Primary Examiner* — Samson B Lemma
*Assistant Examiner* — Blake I Narramore
(74) *Attorney, Agent, or Firm* — Davis Wright Tremaine LLP

(57) ABSTRACT

An augmented reality device engages in a mutual exchange of negotiated services with another device. The negotiation comprises a first exchange of respective zero-knowledge proofs, and second exchange of credentials followed by verification of the credentials by a trusted third party, and further exchanges of information comprising services provided by the augmented reality device to the other device, and vice versa. The services are used, in embodiments, to customize an augmented reality experience.

20 Claims, 13 Drawing Sheets

(56) References Cited

U.S. PATENT DOCUMENTS

| | | | |
|---|---|---|---|
| 2015/0319149 A1* | 11/2015 | Alshammari | H04L 9/0869 |
| | | | 713/171 |
| 2016/0099933 A1* | 4/2016 | Zhu | H04L 9/3218 |
| | | | 726/8 |
| 2017/0364901 A1 | 12/2017 | Chandrasekaran et al. | |
| 2018/0032997 A1 | 2/2018 | Gordon et al. | |
| 2018/0197196 A1 | 7/2018 | Cho et al. | |
| 2018/0234796 A1 | 8/2018 | Saha et al. | |
| 2019/0020480 A1* | 1/2019 | Camenisch | H04L 9/3263 |
| 2019/0204838 A1 | 7/2019 | Haque et al. | |
| 2019/0378055 A1 | 12/2019 | Whitt et al. | |
| 2019/0382235 A1 | 12/2019 | Pahlke et al. | |

* cited by examiner

US 11,146,557 B2

AUGMENTED REALITY SERVICE NEGOTIATION

CROSS-REFERENCE TO RELATED APPLICATIONS

This application claims the benefit of U.S. Provisional Patent Application No. 62/660,891, filed Apr. 20, 2018.

BACKGROUND

The advent of ubiquitous computing has resulted in an era in which large quantities of information about an individual are generated and stored. However, this information is rarely accessible to entities that might make use of the information. Moreover, when such information is available, the entity to which it pertains is often unable to control the entities to which the information is provided. Likewise, it is often not possible for devices controlled by various entities to interact based on this information.

BRIEF DESCRIPTION OF THE DRAWINGS

Various techniques will be described with reference to the drawings, in which.

DETAILED DESCRIPTION

Figure 1:
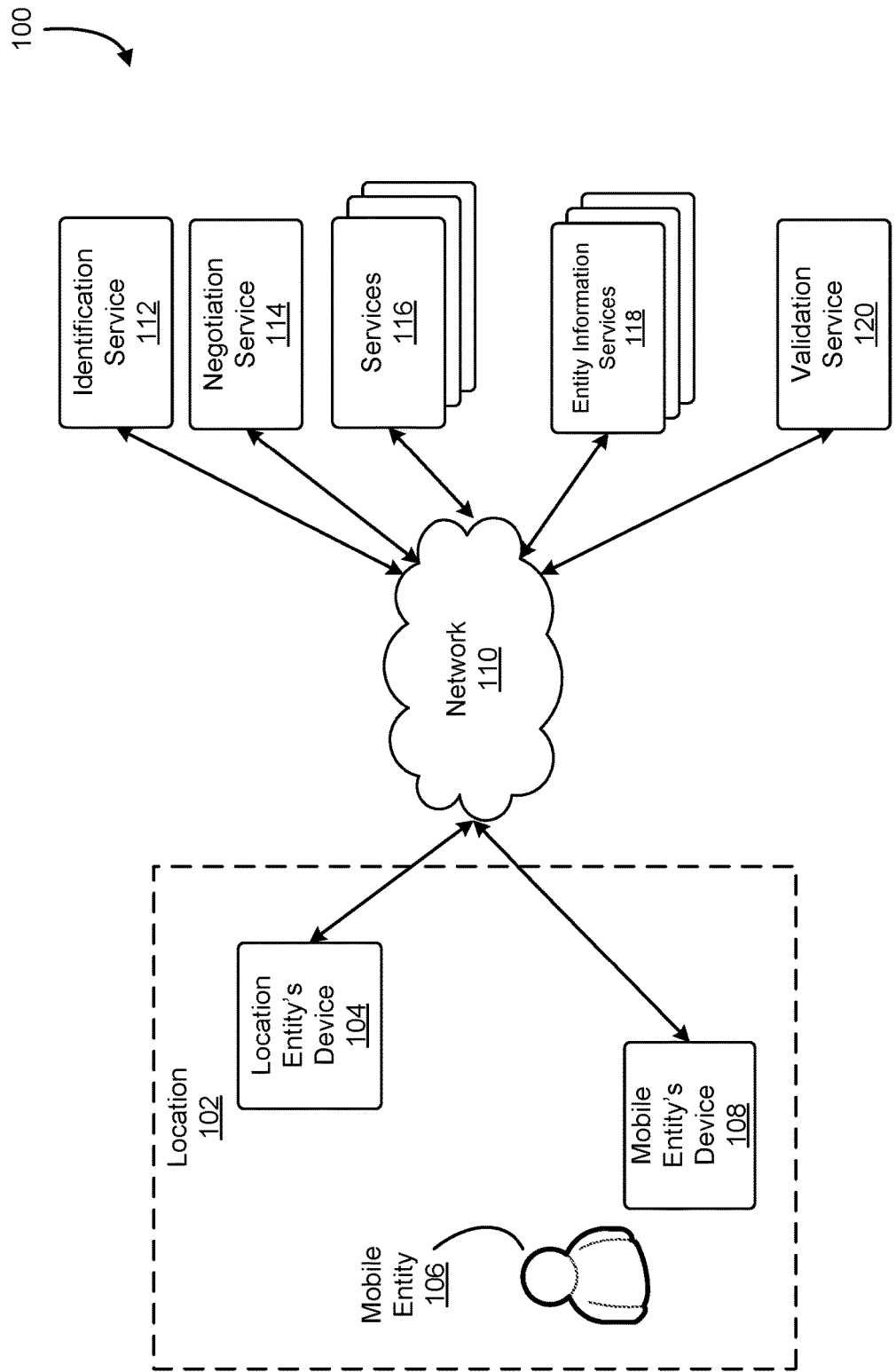
FIG. 1 illustrates an aspect of an environment in which an embodiment may be practiced.

Techniques and systems described below relate to negotiating potential interactions between an augmented reality device and one or more other devices, based on various factors. In one example, the identity of an individual with whom information might be shared is determined via an identification procedure, and a level of authorized interaction determined via a negotiation protocol. Interaction with the individual's augmented reality device proceeds in accordance with the level of authorized interaction.

In an embodiment, an identity of a first entity associated with an augmented reality device is determined with respect to the arrival of the first entity at a location associated with a second entity. In an embodiment, an arrival detection process first determines that the first entity has arrived at the location. An initial level of a negotiation protocol determines if the first entity consents to an identification procedure. If such consent is provided, the identity of the first entity is then determined. This process may be mutual, such that the second entity may also indicate a willingness to be identified, and identified if willing.

As used herein, the term "mobile entity" may be used to refer to an individual (or in some cases, a device such as a car) that is mobile. The term "location entity" is used to refer to an entity associated with a location. Generally, the location is fixed, but the term may be used to refer to "places" such as cruise ships or airplanes.

In an embodiment, further levels of the negotiation protocol determine a level of authorized participation between the devices or services of the first and second entities. Levels of the negotiation protocol exchange a minimal amount of information necessary to complete the negotiation. The negotiation protocol may include a series of information exchanges in which mutual consent for information exchange is determined. This consent may be expressed, in an embodiment, as an agreed-upon set of services, such as programmatic interfaces, that each device makes available to the other.

In an embodiment, based on the authorized level of participation, each of the first and second devices advertises services they provide or authorize access to, and services they are willing to accept or consume. Interaction between the first and second entities then proceeds, based on the advertised and accepted services. For example, in an embodiment, a first entity indicates a willingness to accept interaction customization, based on preferences or interaction patterns. The second entity indicates that it provides interaction customization services. In accordance with embodiments of methods, systems, and computer program products described herein, a match between the accepted and offered services is detected, and the interaction of the first entity is customized via performance of the services.

An entity generally refers to an individual, group, organization, enterprise, or government. Depending on context, an entity may be mobile, e.g., a person or group of people arriving at a geographic location. In some embodiments, an entity such as a person may be associated with another object, such as a car, bicycle, or airplane, which may be treated as linked to the person or group, or as a temporarily associated characteristic of the person or group. Likewise, and entity may be associated with one or more locations.

In embodiments, a service refers to a computer-implemented interface for performing a computing function. The interface may be a standardized, defined, advertised, or discoverable means of interacting with a computing device to perform the computing function(s) of the service. Examples include application programming interfaces, web services, wire-level protocols, and so forth. Augmented reality devices may provide services which may be invoked, given appropriate authorization, by another device or process. Services may also be hosted by cloud-based providers on behalf of an entity.

Embodiments of the present disclosure may be practiced in conjunction with Internet-of-things devices. The term Internet-of-Things (IoT) refers generally to devices which perform everyday tasks—such as coffee makers, refrigerators, ovens, cars, and so forth—that send and receive data via the internet. Other examples include fitness bands, watches, and so forth. These devices may broadcast information which may be used to establish user identity, subject to the negotiation protocol described herein. Once an agreed-upon level of information exchange is established, these devices may transmit information indicative of the preferences of the user, such as menu items the user typically prefers, the room temperature preferred by the user, and so forth. The present disclosure describes how such information exchange may be practiced using such devices. For example, when a user of a smartwatch arrives at a hotel room, the user's smartwatch might engage in the described negotiation protocol with a thermostat in the hotel room. The thermostat might then be provided with the user's desired temperature, and automatically programmed with this preference.

A difficulty that may be encountered in communicating with such devices, and with other devices with whom service interchange might be negotiated, involves winnowing the signals of such devices from other signals. At any given location, there may be a number of signals available, many or most of which do not support the negotiable service levels described herein. As used herein, a signal may refer to wireless signals, or to other signal types. For example, in some instances a signal may be received as an observation made by a device with a sensor, such as a camera.

In an embodiment, devices supporting negotiable services are identified by identifying, from among a number of signals received by the receiver, those signals which are associated with an area transition effect. A signal includes wireless communication, such as a WiFi or BLUETOOTH® signal. A transition effect, as explained herein, refers to a change to a change to a signal, as it is received by a device, when that device is carried across a threshold. Examples of thresholds include doors, archways, and other building features. Having identified signals exhibiting this effect, the threshold-crossing device then selects from among these signals a signal which includes information indicating that the source of the signal is a provider of a negotiable service. A negotiation protocol may then be conducted, resulting in a determination of what services each device can provide to the other.

In an embodiment, an arrival of a first entity at a location is detected using an adaptation of the BLUETOOTH® protocols. In an embodiment, the arrival of the first entity at the location is detected based on a process by which BLUETOOTH® beacon signals are selectively reduced to a viable set based on power signal analysis and location-based reduction.

A BLUETOOTH® beacon is a transmitter device that broadcasts a unique identifier to other nearby devices. Typically, a BLUETOOTH® beacon is a low-energy transmitter. There may, nevertheless, be a large number of beacon signals in any given area. The described location process selectively reduces these signals to a set that for which it is viable to perform further analysis to determine whether the beacon is associated with location or second entity, and to determine whether service-exchange negotiations should proceed.

In an embodiment, a mobile entity carries a device which comprises a receiver for signals broadcast from BLUETOOTH® beacons. From among the detected beacons, a beacon associated with the location and a second entity is identified, triggering a negotiation protocol.

In an embodiment, the obtained set of identifiers is reduced by accessing a database of identifiers. For example, a database may comprise a list of BLUETOOTH® identifiers and information indicating identifiers that are associated with negotiable services.

In an embodiment, the database is indexed by geographic location. A device held by the individual receives global positioning system ("GPS") coordinates, or otherwise determines a location. The database is then queried to obtain a list of identifiers that are both located near the current user and available for negotiation. The list is then cross-referenced with identifiers being broadcast by nearby beacons, thereby obtaining a candidate list of negotiation partners.

Typically, identifiers with higher power represent nearer beacons. However, there may be an area transition effect in which the signals from beacons in a nearby area are received with less power prior to or during an area transition, and with relatively more power subsequent to the transition. For example, an identifier may be received with lower power as the user & receiver enter a doorway, and then received with higher power after the doorway has been crossed.

In an embodiment, filtering is applied to the received beacon signals to estimate a probability that an associated identifier is representative of a nearby beacon. For example, Kalman filtering may be used to compensate for or supplements the aforementioned transition effect. A variety of filtering techniques may be employed to reduce the set of signals that are analyzed. Filtering may be applied in stages, e.g. prior to analyzing signals for a transition effect, and again once signals exhibiting such effects have been identified.

In an embodiment, direction of movement observations are used to increase accuracy of the determined set of identifiers. For example, direction of movement observations may be obtained via GPS readings, inertial sensors, and so on. Based on direction of movement observations and observations of area transition effects (as described above), it is determined whether an identifier is associated with a space that is being left or entered.

In an embodiment, movement observations are used to determine whether identifiers are associated with a space that is likely to be entered. For example, it may be determined that the individual typically enters a particular space following a preceding pattern of movement. For example, it might be observed that an individual typically enters a particular establishment after first moving into another location, such as a hallway or parking lot.

In an embodiment, the arrival of an entity at a location is detected based on an identifier broadcast by a device carried, worn, or otherwise borne by an individual. The identifiers are read by a receiving device at the location.

In an embodiment, the arrival of an entity at a location is detected using recognition techniques, such as facial recognition technology. In such embodiments, facial recognition is employed to identify an individual as the individual arrives at a location or is presented to a camera.

In an embodiment, the arrival of an entity at a location is detected using audio or biometric technology, such as voice printing, fingerprinting, retinal scanning, and so forth. These techniques are, in various embodiments, combined to improve detection accuracy over a method used individually.

In an embodiment, a negotiation protocol is carried out on behalf of a first entity that has arrived at a location and a second entity that is associated with the location. For example, the first entity may correspond to an individual and the second entity may correspond to an organization.

In an embodiment, the negotiation protocol comprises a series of interchanges, each of which involves a minimal transfer of sensitive information. For example, in an embodiment, a series of information exchanges occurs. During each exchange, only information that has been previously authorized for disclosure is exchanged. The authorization may occur during an earlier interchange. For example, a first level exchange might determine whether a given individual has consented to or is permitted to participate in further negotiation. If so, a second level of exchange might occur, in which more information, such as information that might be necessary to validate the individual's and enterprise's identities, might be exchanged. Then, a third level of exchange might occur, such as identifying and invoking available services.

In an embodiment, a zero-knowledge protocol, sometimes referred to as a zero-knowledge proof, is employed. A zero-knowledge protocol is a method of exchanging information in which knowledge K is provided by a first party (the "prover") is verified by a second party (the "verifier"), and in which no information other than the fact that the provider is in possession of knowledge K. In an embodiment, each entity is a prover in a first application of a zero-knowledge protocol and a verifier in a second application of a zero-knowledge protocol.

In an embodiment, a series of zero-knowledge proofs are undertaken, in which increasing levels of information are verified in each exchange. In each exchange, each party provides information which does not exceed a threshold sensitivity, but which is sufficient to determine whether the threshold should be increased in the next exchange.

In an embodiment, following application of one or more zero-knowledge proofs, the negotiation process continues by exchanging information about available services, and invoking one or more of the available services. This process may repeat, depending on the outcome of each service invocation, to permit further services to be exposed.

For example, in an embodiment, the first and second entities each advertise a credential service through which validation credentials may be exchange. The service is provided after an initial zero-knowledge proof of each entity's willingness and ability to participate in a negotiation process. After the zero-knowledge proof, each entity may invoke the other's respective service to obtain credentials, and validate the credentials through a third-party validation service. Upon completion of this process, a further set of services is advertised and invoked. For example, a device of the first entity (e.g., the individual's mobile phone) might advertise the individual's preferences, and a device of the second entity (e.g., a computing device at the location) might advertise a service which can customize the individual's experience at the location, a service which can provide information about the location, and so on.

In an embodiment, various information and computing services providers store data and operate services on behalf of the entities. These services may be described herein using the term entity services, entity databases, and so forth. Access to these services may be controlled via the negotiation protocol and the services advertised by an entity's device.

Entity services may provide a variety of information and interface. In an embodiment, and entity service maintains a store of preference information. The preference information might include favorite foods, preferred room temperature, subjects of interest, and so forth. In other cases and embodiments, entity services might comprise travel history, locations recently visited, and so on. Entity services may also maintain various biographical information, such as name, address, age, education, and so forth. However, entity services do not disclose information without at least performing the negotiation protocol described herein.

In an embodiment, an entity service stores information comprising "cookies" stored at the request of an entity. The information may be persistent, may expire after a predetermined period, or may be deleted by the entity to which the information pertains.

In an embodiment, a location entity stores information pertinent to a mobile entity visiting the location. The location entity can use the information, for example, to retain preferences of the mobile entity between visits to the location, to store a history of transactions conducted at the location, and so forth. The location entity may store this "cookie" of information after negotiating with the mobile entity's device to determine if such storing is authorized by the mobile entity.

In an embodiment, information associated with the mobile entity is shared between multiple location entities. Access to the information is made subject to constraints imposed by the mobile entity's security preferences, as obtained from the negotiation protocol.

In an embodiment, preferences provided by a mobile entity to a first location entity are made available to a second location entity. For example, the mobile entity might express a preference for food choices, such as how much spice the entity prefers, which can be stored by the first location entity and accessed by a second location entity in order to customize the mobile entity's experience at the second location. The second location entity might, for example, offer food choices having a similar spiciness level as were indicated by the first location entity.

In an embodiment, data provided by entities is synchronized. In an embodiment, there are, for a given mobile entity, a plurality of data collections. Each of the plurality of data collections may pertain to a location entity. For example, a first data collection might pertain to a first location, and a second data collection might pertain to a second location. In an embodiment, synchronization involves copying data between the collections, while resolving conflicts as necessary. As an example, a user preference in one collection can be mapped to a user preference in a second collection.

In an embodiment, a normalization process is applied to data received from or provided to an entity. Normalization relates to adjusting data to facilitate meaningful interchange of information. For example, some entities might rate a quality on a scale of 1 to 10, while others might rate a quality on a scale of 1 to 5. A rating value of 5 means very different things in the two scales. Accordingly, a normalization process might adjust or translate these ratings to a standardized scale, in order to facilitate interchange of the rating information between entities. The normalization may further be conducted based on data from other entities, such as other mobile entities. For example, a first mobile entity might rate food as "2" on a five-star spiciness scale, at a location where other entities tend to rate the food as a "4." The first entity's perception of the scale may therefore tend to be somewhat low. Suggestions and preferences may then be based on this knowledge, perhaps by offering the entity spicier food. In an embodiment, a classifier, such as an artificial neural network, Bayesian classifier, support vector machine, and so forth, is trained to perform the normalization.

Embodiments of the present disclosure may be applied in a variety of circumstances to perform a variety of functions, based on the disclosed techniques for negotiating service availability and service participation.

In an embodiment, a negotiation process identifies facts an entity is willing to share, and conditions for sharing facts. For example, information about an individual may be restricted to information pertinent to the entity's current location. Information such as the entity's location may be considered to be part of the context of a transaction. As used herein, a transaction refers to a potential, predicted, ongoing, or concluded exchange or interaction between entities. For example, a transaction might be used to refer to a potential exchange between a mobile entity and a location entity that begins when the first entity arrives at the location. More generally, transactions may be related to sessions of information sharing and service exchange.

In embodiments, a result of the negotiation process is a set of services which are made available by the respective devices. The negotiation process determines which services, of those implemented by the device, are to be made available to the other device. The set of services that are made available includes those that are consistent with a permissible level of information sharing, and excludes those which are not.

In an embodiment, a service makes facts about an individual available to a location entity in order to facilitate or enhance a transaction. The facts may include, in various combinations, information about food allergies, menu preferences, temperature preferences, lighting preferences, music preferences, and so forth.

In an embodiment, a service makes facts about an individual's transaction history available to a location entity. The facts may include, in various combinations, prior transactions at the same location, prior transactions at other locations, a history of product-specific questions asked by the entity, and so forth.

In an embodiment, preference information is aggregated to arrive at a group consensus preference. For example, each of a number of individuals at a location (i.e., a number of mobile entity devices) provides preference information regarding a music selection. Based on aggregates of the music preferences, a conforming music playlist is selected. In another embodiment, environmental factors such as lighting and temperature are selected. This consensus preference information may also be made available as a service.

In an embodiment, services are provided to facilitate a group search or group consensus-forming. For example, each of a plurality of mobile entity devices may provide preference information related to food preferences. Based on an intersection of the preferences, a list of suggested nearby restaurants is provided.

In another embodiment, a service exchanges information pertinent to availability for employment. Related services may also be made available, including a credential verification service, a calendar service to indicate times the entity is available for employment, and a price negotiation service which may, for example, automate acceptance of a job at a negotiated price.

In an embodiment, services are offered to provide incentives. In a further aspect, incentives are offered to a plurality of entities in order to steer a desired outcome. Examples of a desired outcome include encouraging movement of individuals to another location (i.e., from the hardware department to the clothing department, or from a crowded bar to a nearby restaurant that has seating available).

In an embodiment, advertisements and promotional information are offered to mobile entities, in response to authorization of such services and the exposure, by the mobile entity's device, of services which enable the provision of these services.

In an embodiment, payments are completed via services offered by the location entity and/or mobile entity.

In an embodiment, an auction is conducted via an auction participation service of a mobile entity, interfacing with an auction conduction service of a location entity.

In an embodiment, an elevator is summoned responsive to the arrival of an individual at a location. For example, a location entity might offer a service to hail elevators. This service might be made available following a negotiation protocol in which the identity of a mobile entity is determined. The service might further automate or facilitate the selection of a destination floor for the elevator, based on security information provided by a service made available by the mobile entity's device.

In an embodiment, a device may provide one or more services which inform the other device concerning available services. These queries may be subject to constraints imposed by the negotiation process. For example, services which exceed a mutually agreed-upon sensitivity level may be hidden in the results of such queries.

In an embodiment, participation in or offering of services may be context-dependent or conditional. For example, a preference service operating on behalf of a mobile entity may only be offered while the corresponding entity is at a selected location. When the entity leaves the location, the offering is terminated. Likewise, a location entity may permit participation in a service only to mobile entities currently at the location. In an embodiment, the ability to use a service expires after a period of time subsequent to leaving a location.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the fields of device-to-device interaction and security, by proposing location-sensitive, escalating information exchange. Additionally, techniques described and suggested in the present disclosure improve the function of network-connected devices by proposing techniques for more secure discovery of services provided by networked devices. Moreover, techniques described and suggested in the present disclosure are necessarily rooted in computer technology in order to overcome problems specifically arising in the field of networked devices.

FIG. 1 illustrates an aspect of an environment 100 in which an embodiment may be practiced. Specifically, FIG. 1 depicts a network-accessible assemblage of services, by which interaction between a device 108 of a mobile entity 106 and a device 104 of an entity associated with a location 102 occurs. Note that although FIG. 1 depicts a single mobile entity's device 108 and a single location entity's device 104, in various embodiments a plurality of such devices may be present and may participate in a service negotiation process. The mobile entity's device 108, in various embodiments, may be any of a variety of augmented reality devices, such as augmented reality glasses, smartphones, projectors, goggles, and so forth.

The location 102 may be associated with an entity, referred to herein as a location entity. For example, the location 102 may be a store, airport, shopping mall, school, government building, and so forth. The location entity is an entity associated with the location 102.

A device 104 may be placed in the location 102 by the location entity. The location entity's device 104 transmits a location identifier which is received by the mobile entity's device 108. The mobile entity's device may be a computing device with a receiver suitable for detecting the transmitted identifier, or a receiving device which may be connected at the location 102 to a computing device.

In an embodiment, the mobile entity's device 108 transmits an identifier read by the location entity's device 104. In other cases and embodiments, both the location entity device 104 and the mobile entity device 108 transmit an identifier.

In an embodiment, the services 112-120 are accessible to the devices 104, 108 via a network 110. The network 110 may, for example, comprise a wireless network and the Internet. The services 112-120 may be invoked using various protocols, such as various web service, simple object access protocol ("SOAP"), or representational state ("REST") protocols. These examples are not intended to be limiting, and as such should not be construed in a manner which would limit the scope of the present disclosure to only those embodiments which include the specific examples provided.

In an embodiment, the identification service 112 determines identity information based on data sent from the mobile entity's device 108 and/or location entity's device 104. The identity information comprises information used to enable negotiation to proceed, and may exclude other information, and in particular other information which may be considered sensitive or subject to regulatory restrictions.

In an embodiment, the negotiation service 114 facilitates a negotiation between the location entity device 104 and the mobile entity's device 108. The negotiation, in an embodiment, is performed by hosted services external to the devices 104, 108. As described herein, the negotiation comprises a series of interchanges in which increasing amounts of information is exchanged. An example is provided by FIG. 4.

The services 116 refers to a variety of hosted computing services that may operate on behalf of the mobile entity 106, the entity associated with the location 102, or other entities, such as a third party. The services 116 may operate on a device, such as an augmented reality device, or on a hosted computer system. Examples of services include a web service interface for providing preferences of the mobile entity 106, a web service interface enabling a device or devices of the location entity to receive the mobile entity's 106 preferences, interfaces permitting environment of the location 102 to be customized based on the preferences, and so on.

The entity information services 118 are another example of a service. In an embodiment, information about entities is stored and normalized to facilitate interchange of persistent information about an entity. These functions are performed by the entity information services 118.

The validation services 120 are an example of a service which may be accessed during negotiation or at other times. In an embodiment, the validation services 120 are a trusted third-party capable of providing identity verification services. In another example, the validation services 120 are a trusted third-party capable of validating other information, such as qualifications to perform a task.

In an embodiment, a multi-entity service negotiation is performed. This may proceed similarly to a negotiation between the entity's devices 104, 108 as depicted in FIG. 1, except that mutual consent to information exchange is made between each of the respective devices.

Figure 2:
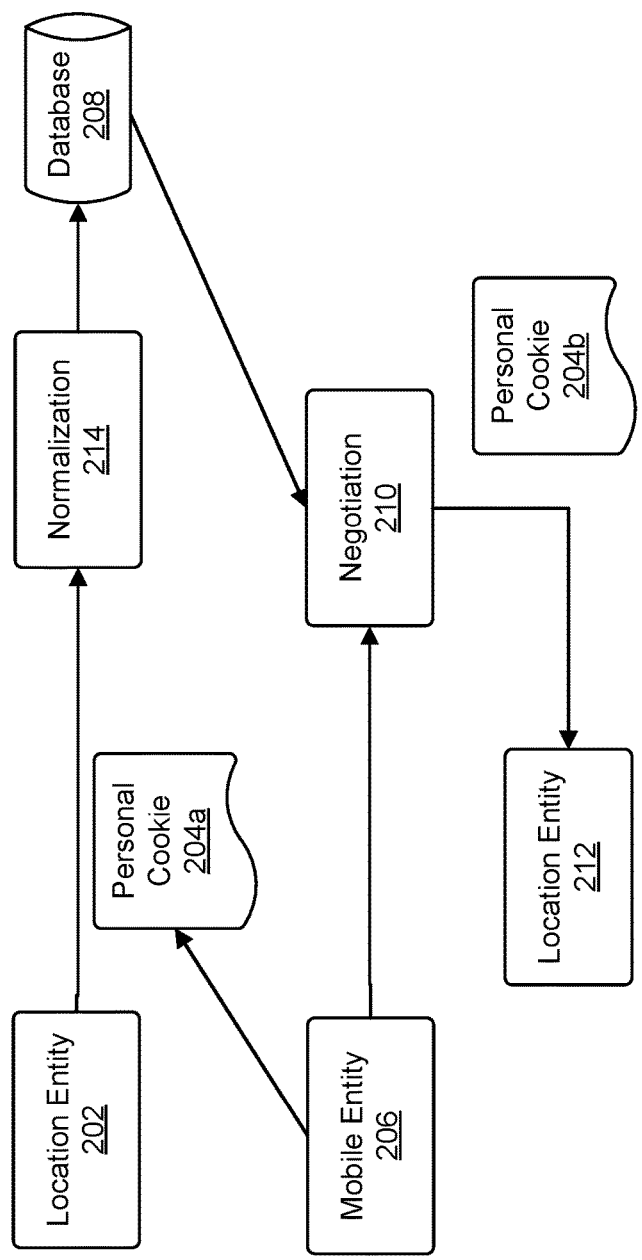
FIG. 2 illustrates an example of interchange of information between entities, in accordance with an embodiment.

FIG. 2 illustrates an example 200 of interchange of information between entities. In the example 200, a mobile entity 206 interacts, consistent with the techniques proposed herein, with a first location entity 202. A result of the interaction is data recorded in a personal cookie 204a. Here, "personal cookie" refers to data pertaining to the mobile entity that is persistent and which may, subject to a negotiation process, be shared with another entity such as a second location entity 212.

Data in the personal cookie 204a is subjected to a normalization process 214 and stored in a database 208. The normalization 214 adjusts data in the personal cookie 204a to facilitate interchange between the entities 202, 212, by converting data in the personal cookie 204 to a format and/or scale that can be understood by other entities.

The database 208 records data from the personal cookie 204a. The data may be provided, as personal cookie 204b, to the second location entity 212 if authorized by a negotiation process 210.

Figure 3:
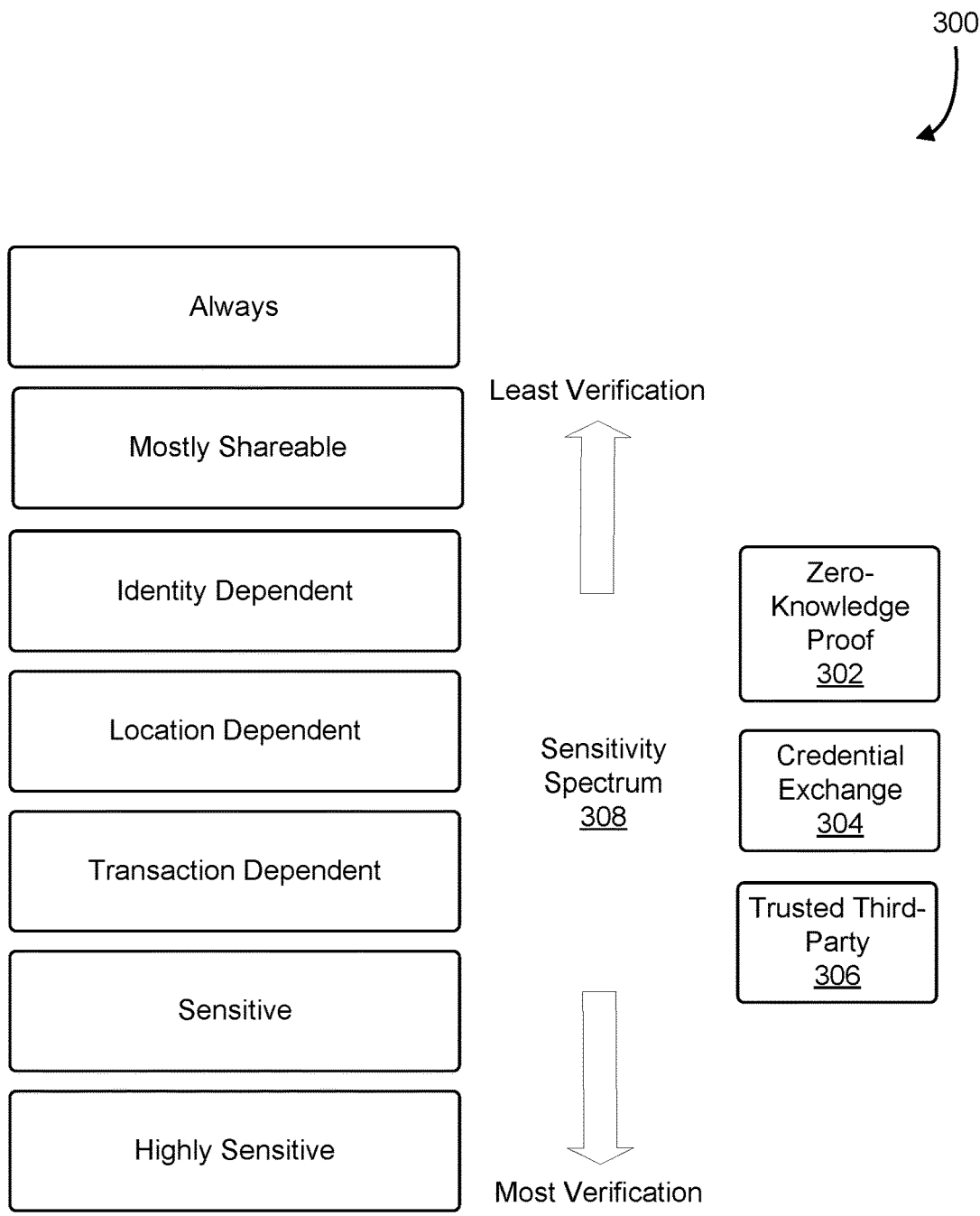
FIG. 3 illustrates an example of a data sensitivity spectrum, in accordance with an embodiment.

FIG. 3 illustrates an example 300 of a data sensitivity spectrum 308. In an embodiment, access to an entity's data is restricted in accordance with the data sensitivity spectrum 308. As illustrated by FIG. 3, data may be categorized according to levels of sensitivity. Some data may be considered to be always sharable. For example, an identity beacon transmitted by a mobile entity's device may be considered always shareable. Similarly, data which may be visually captured in order to facilitate the first level of negotiation may also be considered always sharable. In some instances, some preference information, such as a favorite color, might be considered mostly shareable unless an individual has opted out of the system entirely. Other information may be considered sensitive, or highly sensitive, and is shared only under specific, highly controlled circumstances.

In an embodiment, other data may be sharable depending on context, such as the identity of the other party, the location of the entities, or the transaction being conducted. For example, as described herein, an information sharing session may comprise a period of time in which certain forms of information—related to the purpose of the session—may be shared. Various contextual information, such as that which may be gleaned by identifying cues in the environment of an augmented reality device, may supply such context. For example, a purpose of a visit to a store might be inferred from analysis of the images of objects captured by the camera of an augmented reality device. Other examples of contextual information include location data from a global positioning system, calendar data from the entity, and so forth. Note that a full analysis of context may require access to information from different levels of the sensitivity spectrum. Embodiments may therefore perform several levels of contextual analysis during a negotiation of services, in stages, when and if access to progressively more sensitive data is authorized.

Certain levels of information in the spectrum 308 may be shared based on various levels of verification or authorization. For example, some information may be shared based on an initial, zero-knowledge proof 302. Other information might be exchanged after an account or other credentials are verified through credential exchange 304. For more sensitive information, a trusted third-party 306 can be used. For example, the trusted third-party 306 might be used to verify the credentials of each party.

Figure 4:
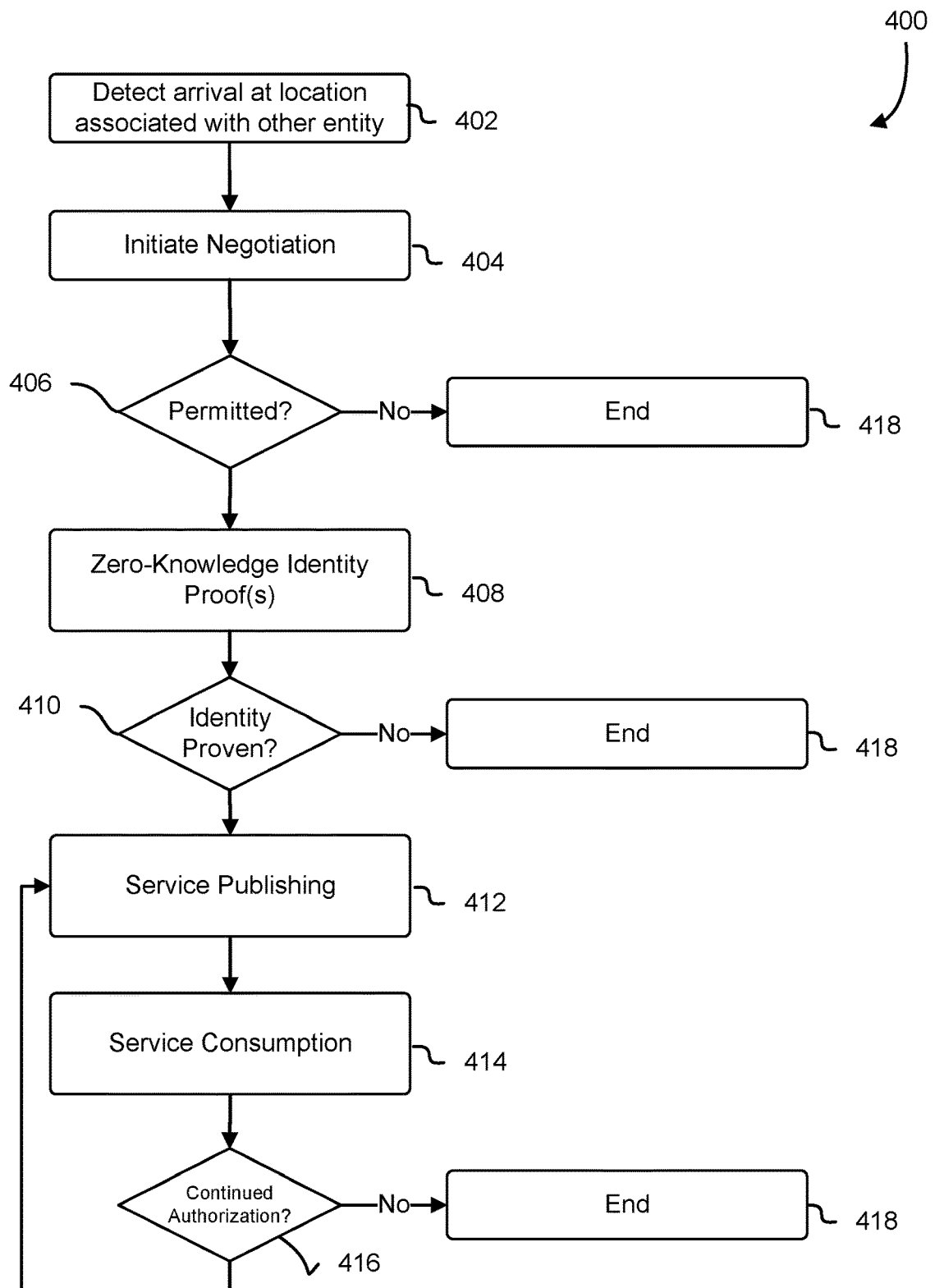
FIG. 4 is a flowchart illustrating an example of a process for negotiating exchange of information and service participation, in accordance with an embodiment.

FIG. 4 is a flowchart illustrating an example of a process 400 for negotiating an exchange of information and service participation, in accordance with an embodiment. Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 13:
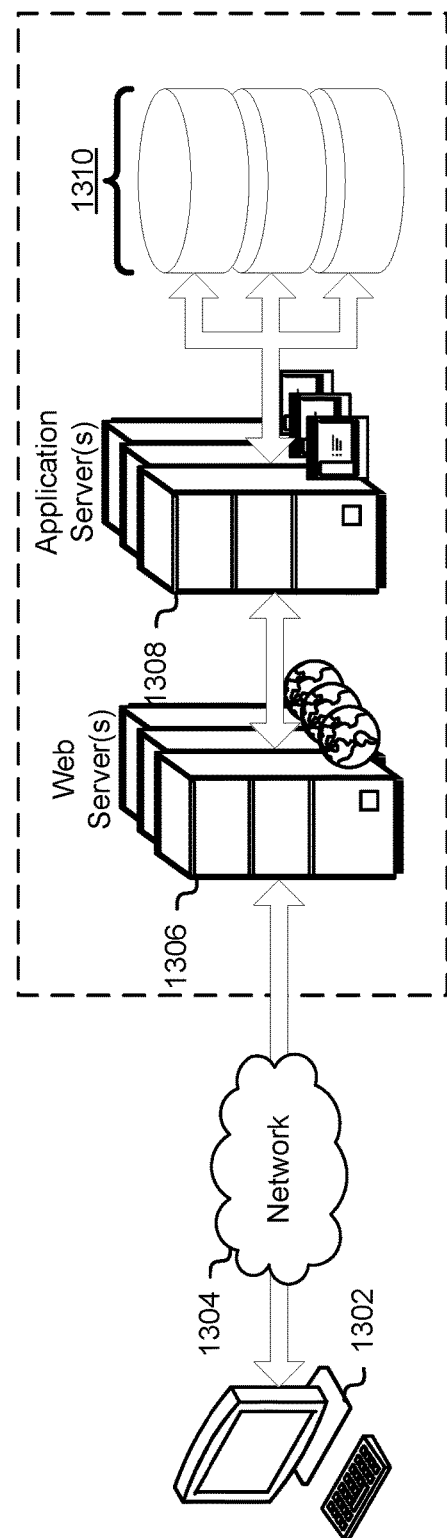
FIG. 13 illustrates an environment in which various embodiments can be implemented.

For example, some or all of process 400 may be performed by any suitable system, such as a server in a data center, by various components of the environments described herein, including those depicted in FIG. 1, and in FIG. 13, such as the one or more web servers 1306 or the one or more application servers 1308, by multiple computing devices in a distributed system of a computing resource service provider, or by any electronic client device such as the electronic client device 1302. The process 400 includes a series of operations which, except where logically required (for example because the input to one step requires the output of a previous step, may be performed in an alternative order, or performed in parallel. In some embodiments, certain steps may be omitted.

In 402, the arrival of a mobile entity at a location is detected, where the location is associated with a second entity. For the purpose of this example, the second entity may be referred to as a location entity, but in other cases and embodiments the second entity may be another mobile entity, or some other entity.

In 404, negotiation is initiated. Negotiation refers to a series of interactions in which it is determined what types of information may be exchanged between the entities and what types of services are available and authorized.

In 406, a decision is made regarding whether negotiation may commence. Based on various factors, negotiation may be prohibited. For example, based on facial recognition technology, it may be determined that the mobile entity is an individual that is too young, based on laws and regulations, to collect information from. In another example, the entity may have previously expressed a desire to be excluded from the process. Rather than performing facial recognition, other techniques may be used, such as the identification of a non-consent code in a signal sent from the mobile entity's device. Alternatively, the mobile entity begins the process with an initial request to negotiate service exchange.

If the negotiation is permitted, in 408 zero-knowledge proofs are performed to confirm basic information about the identity of the parties. For example, both entities' devices may submit, to each other, a zero-knowledge proof of their ability to participate in a service negotiation process, which is then verified by the other party. This may then escalate to an exchange and verification of credentials.

In 410, it is determined whether the identities have been sufficiently proven. If so, a process of service publishing and service consumption continues in 412 and 414. In some cases, a first level of service interaction must occur before a subsequent level. For example, an agent of the mobile entity might publish a conditional preferences services, which might then be consumed by an agent of the location entity. If the conditions are met, an agent of the mobile entity might then publish a set of services which make available various types of preference information. The services published comprise those which the respective devices or entities are authorized to use.

In 416, it is determined whether there is continued authorization to participate in service publishing and consumption. Authorization might be terminated based on various factors, such as the results of prior service invocations, a change in location, and so on. In various embodiments, the end of an information sharing session is determined from a change in context, such as a departure of one of the involved entities, the passage of time, the end of a scheduled time period, the conclusion of a transaction, and so forth.

Figure 5:
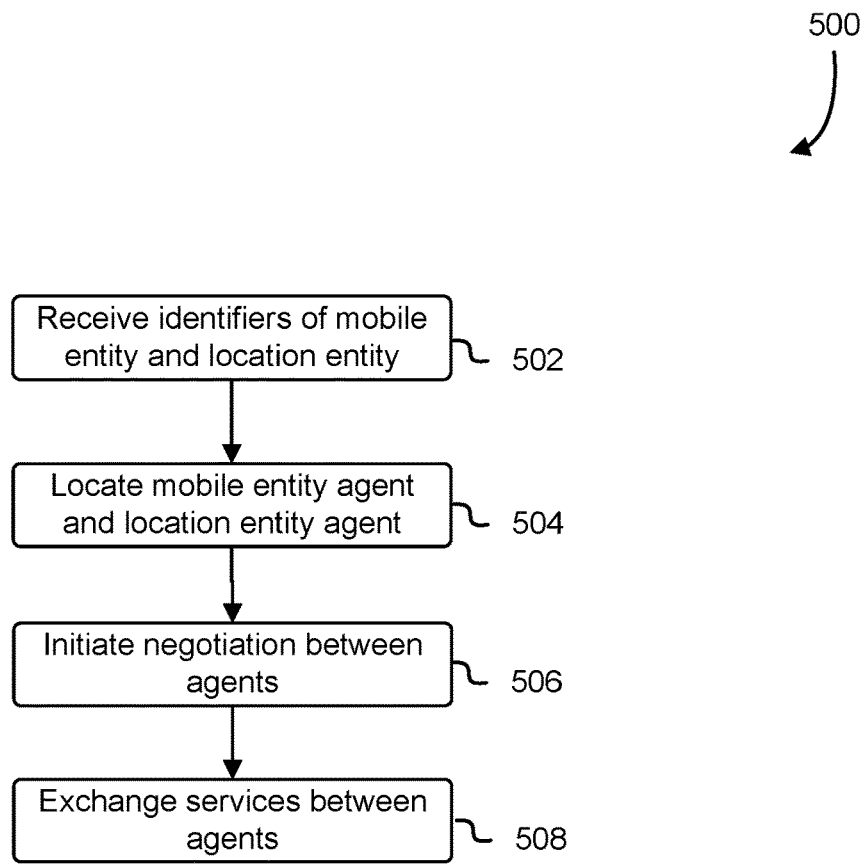
FIG. 5 is a flowchart illustrating an example of a process for initiating a negotiation, in accordance with an embodiment.

FIG. 5 is a flowchart illustrating an example of a process 500 for initiating a negotiation, in accordance with an embodiment. Some or all of the process (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process may be performed by any suitable system, such as a server in a data center, by various components of the environments described herein, including those depicted in FIG. 1, and in FIG. 13, such as the one or more web servers 1306 or the one or more application servers 1308, by multiple computing devices in a distributed system of a computing resource service provider, or by any electronic client device such as the electronic client device 1302. The process includes a series of operations which, except where logically required (for example because the input to one step requires the output of a previous step, may be performed in an alternative order, or performed in parallel. In some embodiments, certain steps may be omitted.

In 502, an identification service, such as the identification service depicted in FIG. 1, receives identifiers of a mobile entity and a location entity. The identification service may, in embodiments, possess a superset of the information possessed by each respective party, but does not permit a service operating on behalf of one party access to data associated with the other, until negotiation has completed.

In 504, the identification service locates agents that may negotiate on behalf of the mobile entity and the location entity. In an embodiment, the agents are implemented as hosted services accessible via a network, such as the internet. In another embodiment, an agent is implemented on a device of the mobile entity and/or the location entity.

In an embodiment, the agents are located by using a hosted database service to map from the identifiers to agents of the respective parties.

In 506, the negotiation is initiated between the located agents. As described herein, the negotiation comprise a series of exchanges, each of which involves progressively more sensitive data and each if which is performed only upon the mutual consent of both parties. For example, in an embodiment, the negotiation comprises mutual zero-knowledge proofs, mutual credential exchange and validation, and exchange of available services.

At 508, depending on the outcome of the negotiation, the services provided by each entity's device (or provided by the agents on behalf of the entities) are exchanged between the two agents. For example, a mobile entity's agent might advertise services that provide preference information, while a location entity's agent might advertise services that enable the completion of a transaction. Note that some of these services might be invoked by directly contacting the entity's device, while others might be invoked by contacting a hosted service. The advertisements of the services, therefore, include information such as internet-protocol addresses, formats, and other information necessary to invoke the service. Further, a cryptographic key or other data might be provided to allow the other entity to invoke the service, while preventing third party interference.

A service negotiation may be made in response to the identification of a device with which the service negotiation may be conducted. It may be difficult, however, to determine when to look for such devices, or to efficiently locate a signal from such a device, given the preponderance of other signals in the wireless spectrum.

Figure 6:
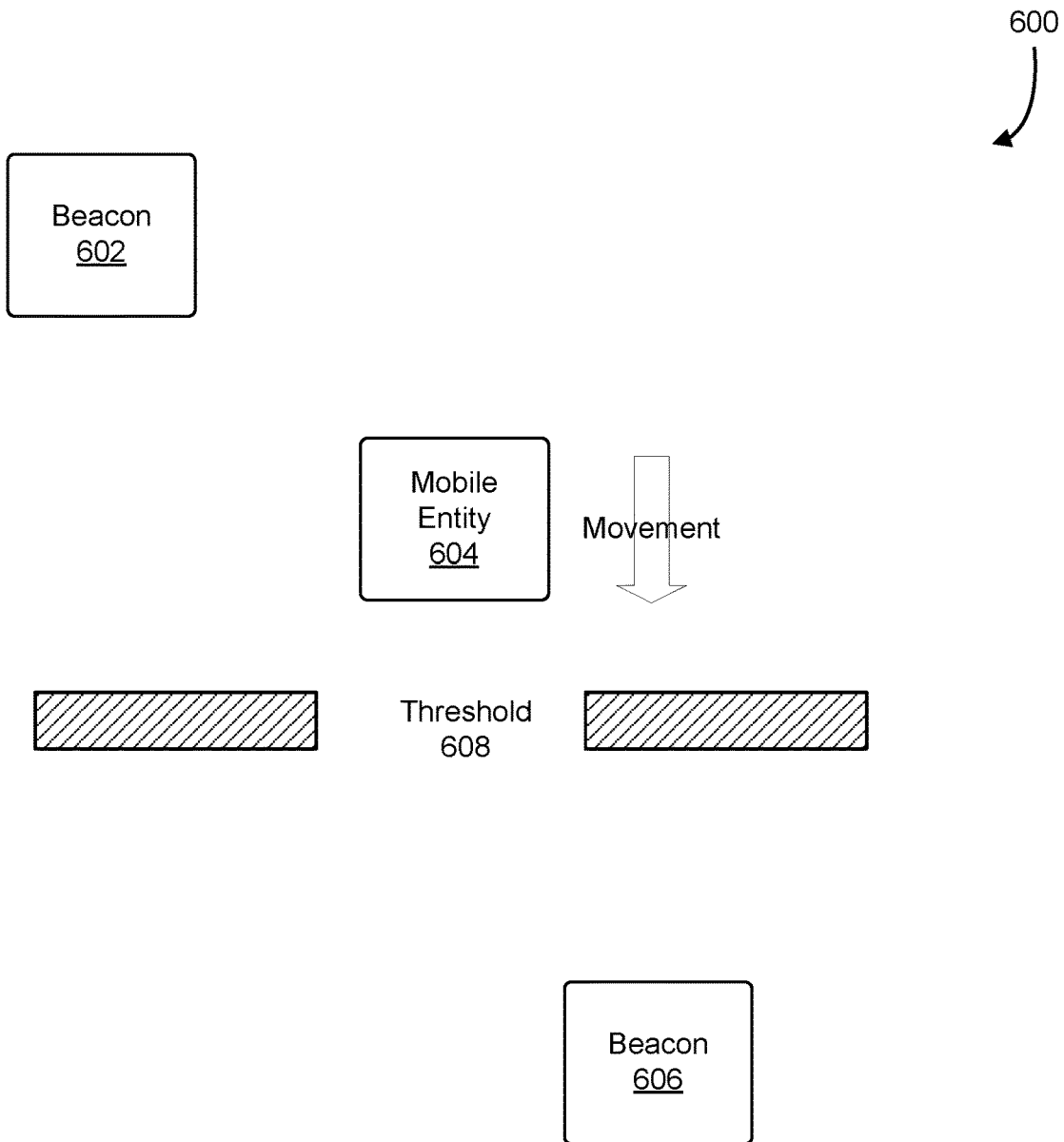
FIG. 6 illustrates an example of a mobile entity crossing a threshold, in accordance with an embodiment.

FIG. 6 illustrates an example 600 of a mobile entity 604 crossing a threshold 608. The mobile entity 604 may, for example, be entering a room from outside, or from another room. For the purposes of the example 600, it may be presumed that there are two beacons 602, 606. The first beacon 602, for the purpose of the example 600, is on one side of the threshold 608, while the other beacon 606 is on the opposite side. As depicted in FIG. 6, the mobile entity 604 is crossing the threshold 608. Consequently, in the example 600 the beacon 606 is considered to be of interest to mobile entity 604, whereas the beacon 602 may be of lessor interest, or of no interest, to the mobile entity 604. Described herein are techniques for differentiating between signals broadcast by the two beacons and determining which signals should be processed, for the purpose of initiating service negotiation.

For example, using the differentiation techniques described herein, an identifier or other information broadcast by the beacon 606 may be obtained efficiently, even in view of a preponderance of extraneous signals. Once the beacon has been identified, the described techniques for negotiation and service interchange may then be performed.

In cases and embodiments, service negotiation and information sharing may be performed in conjunction with various facial-recognition techniques, and in particular with techniques oriented to a database from which the identity of an entity can be determined, based on visually identifiable facial characteristics. This database may be context-dependent, so that its data is accessible to a party only in specific contexts, such as during a meeting with colleagues or other known or consenting individuals.

For example, an augmented reality device may display information related to faces identified within an environment, such as within a meeting room. In an embodiment, an augmented reality device captures image data containing faces, and transmits the data to a cloud-based service provider. The cloud-based service provider identifies facts associated with the captured faces, and transmits the facts back to the augmented reality device for display. Using a position and orientation adjustment technique, relevant facts are displayed near the associated face. This information may include, for example, the person's name, facts about the individual, possible conversation prompts, and information about prior interactions with the person.

In an embodiment, the described techniques for negotiation and service interchange are performed with the identified individual, and then services, facts, or preferences authorized by the individual for sharing are displayed. Moreover, the described techniques for service negotiation may be performed using context derived from the identification of the individual.

In an embodiment, groups of faces are analyzed. Facts or analysis results, such as sentiment analysis results, are displayed. For example, in an embodiment group affiliations are displayed. In another embodiment, properties common to members within view are displayed. Various visual indications may be displayed to indicate facts pertinent to groups rather than individuals, such as shading, outlines, and so forth. This information may also be used to supply context for the service negotiation process. For example, in embodiments, the set of services made available to the respective parties in a negotiation process may depend on the identity or recognition of the faces.

Figure 7:
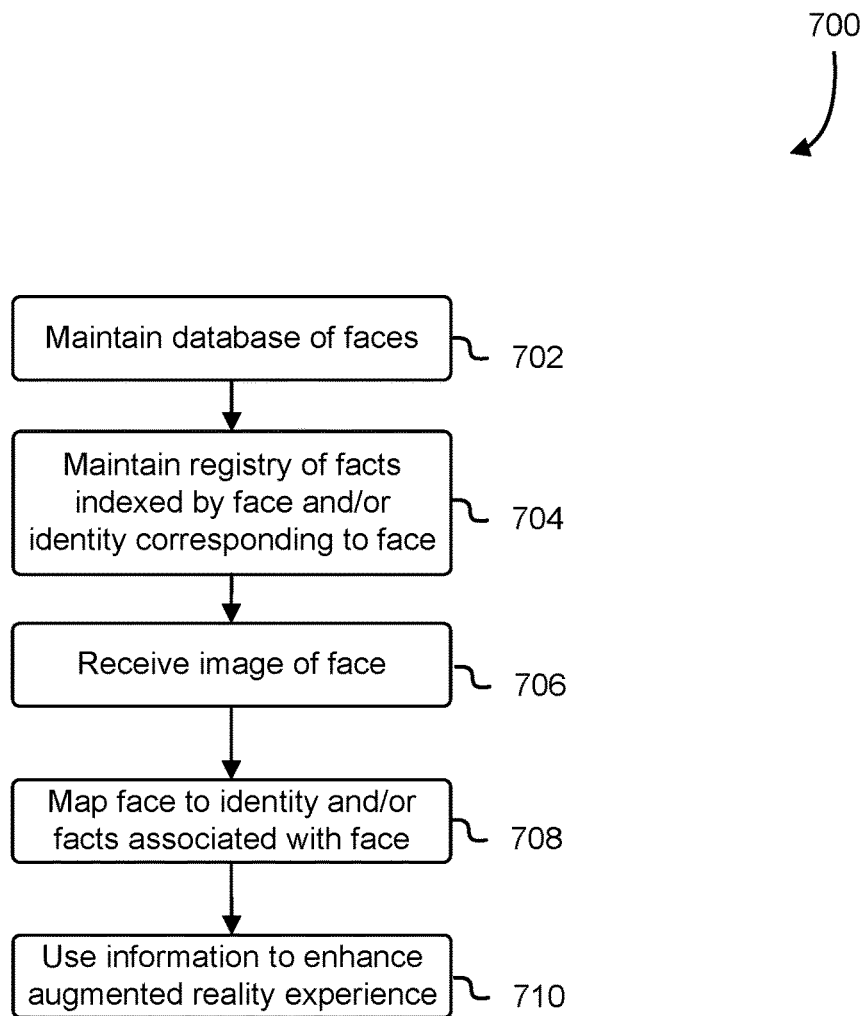
FIG. 7 is a flowchart illustrating an example of a process for obtaining and utilizing contextual information based on facial recognition, in accordance with an embodiment.

FIG. 7 is a flowchart illustrating an example of a process for obtaining and utilizing contextual information based on facial recognition, in accordance with an embodiment. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, in embodiments, some or all of the process may be performed by an augmented reality device. In embodiments, some or all of process may be performed by any suitable system, such as a server in a data center, by various components of the environments described herein, including FIG. 13, such as the one or more web servers 1306 or the one or more application servers 1308, by multiple computing devices in a distributed system of a computing resource service provider, or by any electronic client device such as the electronic client device 1302. In some instances, actions are performed by a hosted process acting as an agent of the augmented reality device. As such, some actions attributed to the device may instead be performed, in whole or in part, by a hosted service.

The process 700 includes a series of operations which, except where logically required (for example because the input to one step requires the output of a previous step, may be performed in an alternative order, or performed in parallel. In some embodiments, certain steps may be omitted.

In 702, a database of faces is maintained. The database may, for example, be maintained by a hosted service, or by computing devices or servers operating in a data center. In embodiments, an enterprise maintains a database comprising data for individuals known to it, such as the employees of the enterprise. In an embodiment, the database comprises facial image data. In another embodiment, the database comprises representational data, as used by associated facial recognition techniques.

In 704, a registry or database of facts is maintained, indexed by biometric signatures such as facial identity characteristics, and/or by identity information corresponding to the biometric signature. For example, in an embodiment, the database is indexed by facial characteristic data, permitting efficient lookup of facts associated with a given face. In another embodiment, a database is indexed by the identities of individuals represented in the database of faces.

In 706, an image comprising a face is received. The image may, for example, be obtained through a camera or cameras associated with an augmented reality display. In an embodiment, the augmented reality display is a smartphone. In another embodiment, the display is comprised in augmented reality glasses, or in an augmented reality headset, or in a projector. In some embodiments, the processing is done remotely to the device which contains the display. For example, the process 700 may be performed by a hosted computing service accessible via the Internet. 706 thus may depict receiving image data from an augmented reality device, via the Internet. In other embodiments, the augmented reality device contains the recognition data, and performs the facial recognition processing locally.

In 708, the characteristics of the face, or an identity determined from the face, is mapped to various facts. Note that the depicted person may not be completely identified. Instead, it may be sufficient, in certain cases and embodiments, to determine if this person is recognized and consistent with other contextual information. For example, instead of determining an individual's identity, it might be sufficient to determine that the person is a recognized employee of a business an entity is dealing with. The recognition of an individual (meaning that the individual is known to have been involved in a previous transaction, as opposed to knowing the identity of the individual) may supply contextual information for a service negotiation. Likewise, factors such as the determination of the identity of the individual, confirmation of the role of the individual in a transaction, and so forth, may supply contextual information for conducting the service negotiation.

At 710, information about the person is used to enhance the augmented reality experience. This may comprise performing a service negotiation, generate and displaying information on an augmented reality device, and so on.

One challenge in providing augmented reality experiences involves handling latency, particularly in view of the user's changing environment. One example involves the proper alignment of information displayed in an augmented reality scene. For example, an augmented reality device might display information about various individuals within the scene. Further, it might attempt to display that information near the relevant individual, so that the user knows who the data applies to. This may, however, be difficult to do because of the movement of the user and the observed individuals.

Such movement may also be relevant to other scenarios, such as establishing context for the negotiation of services. For example, an individual might be observed passing through the user's field of vision. If so, this individual should, in most cases, not be used to establish the context of the negotiation.

Figure 8:
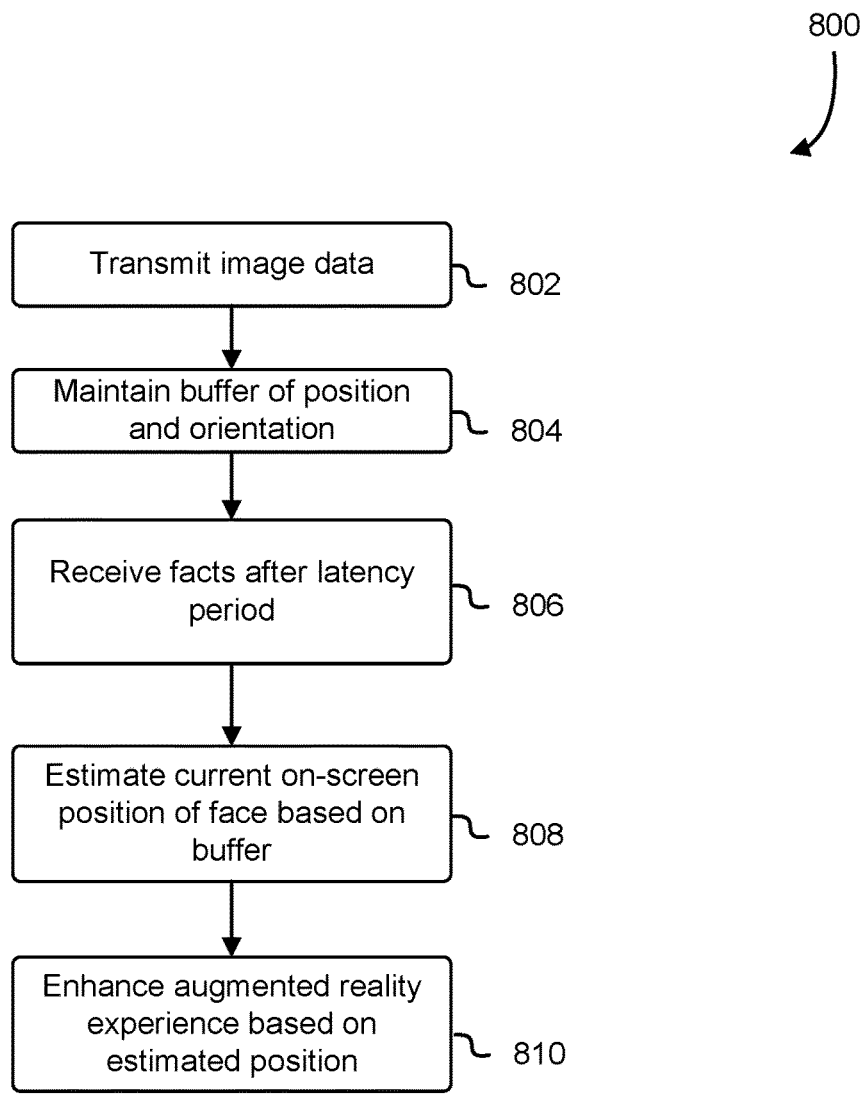
FIG. 8 is a flowchart illustrating an example of a process for responding to changes in an observed user environment, in accordance with an embodiment.

FIG. 8 is a flowchart illustrating an example of a process 800 for responding to changes in an observed user environment, in accordance with an embodiment. Some or all of the process (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process may be performed by any suitable augmented reality device, such as a wearable computing device, i.e., augmented reality glasses. The process includes a series of operations which, except where logically required (for example because the input to one step requires the output of a previous step, may be performed in an alternative order, or performed in parallel. In some embodiments, certain steps may be omitted.

In 802, an image or other representative data is transmitted from the augmented reality device to a remote service for processing. The transmission and processing may take a relatively long amount of time, and as such can result in significant latency between when the image is transmitted and when data based on the image is returned to the device. The image may comprise the augmented reality scene as observed by the device, or may comprise portions of such images, such as a depiction of a face. In embodiments, rather than a complete image, various compressed formats are used. In other embodiments, data representing particular characteristics, such as facial identity characteristics, is sent.

In 804, the augmented reality device maintains a buffer of position and orientation information. In an embodiment, the information is maintained over a time sufficient to account for the latency of processing the image data. As the device moves, and as people and things in the augmented reality scene move, the device stores information to describe the movements that have taken place.

In 806, after a period of latency, facts pertinent to the transmitted images are received. During this time, the position and/or orientation of the augmented reality device may have changed. As such, in 808, a current on-screen position of the face is estimated using changes in position and/or orientation since the image was transmitted. This process relies on the buffer, which contains a history of movements. The device may use information in the buffer to trace the path of the identified object within the scene, and calculate an estimated position of the identified face or object.

In 810, the received facts are used to enhance the augmented reality experience. In an embodiment, the facts are displayed in the augmented reality scene, as viewed by the device's user, near the estimated position of the face. The display can then be updated periodically as the view orientation or position of the face changes. In another embodiment, the facts are used to establish context for a service negotiation. For example, the system may determine whether the facts apply to an individual or object that is still in the scene, and if so, use that information to establish context. If not, the information can be disregarded, or in some cases used to determine if information that had been used to establish context should no longer be used.

Figure 9:
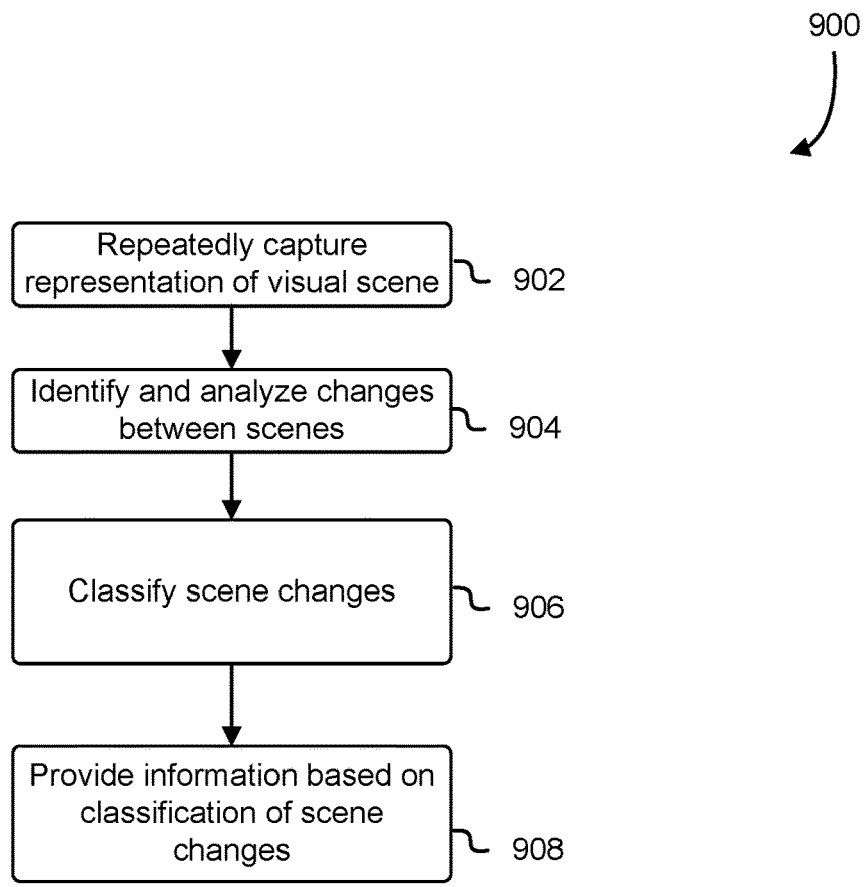
FIG. 9 is a flowchart illustrating an example of a process for identifying changes in an augmented reality scene.

Contextual cues for a service negotiation may sometimes be derived from changes in the scene viewed by an augmented reality device. FIG. 9 is a flowchart illustrating an example of a process 900 for identifying changes in an augmented reality scene, in accordance with an embodiment. Some or all of the process (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process may be performed by any suitable system, such as a server in a data center, by various components of the environments described herein, including FIG. 13, such as the one or more web servers 1306 or the one or more application servers 1308, by multiple computing devices in a distributed system of a computing resource service provider, or by any electronic client device such as the electronic client device 1302. The process includes a series of operations which, except where logically required (for example because the input to one step requires the output of a previous step, may be performed in an alternative order, or performed in parallel. In some embodiments, certain steps may be omitted.

In 902, a representation of an augmented reality scene is repeatedly captured. The representation may be in any format suitable for the further processing steps described.

In 904, changes between scenes are identified. This may comprise an encoding step in which raw image data is converted to a differential representation. A filtering process may identify frames in the sequence in which there are large differentials. These may be indicative of notable scene changes.

In 906, the scene changes are classified. Classification comprises identifying changes which may be understood to be important, such as when a person enters or exits a scene. This step may therefore involve identifying changes in the content, rather than appearance, of the scene. For example, some scene changes may involve changes to lighting conditions or other factors, but not involve any changes to content. Similarly, significant scene changes may occur when the user of an augmented reality device crosses a threshold, e.g., by entering a building.

In 908, information is provided based on the classification. The information can comprise useful data, such as a time at which a person arrived at a location, and so forth, a time at which a person left a location, and so forth.

Figure 10:
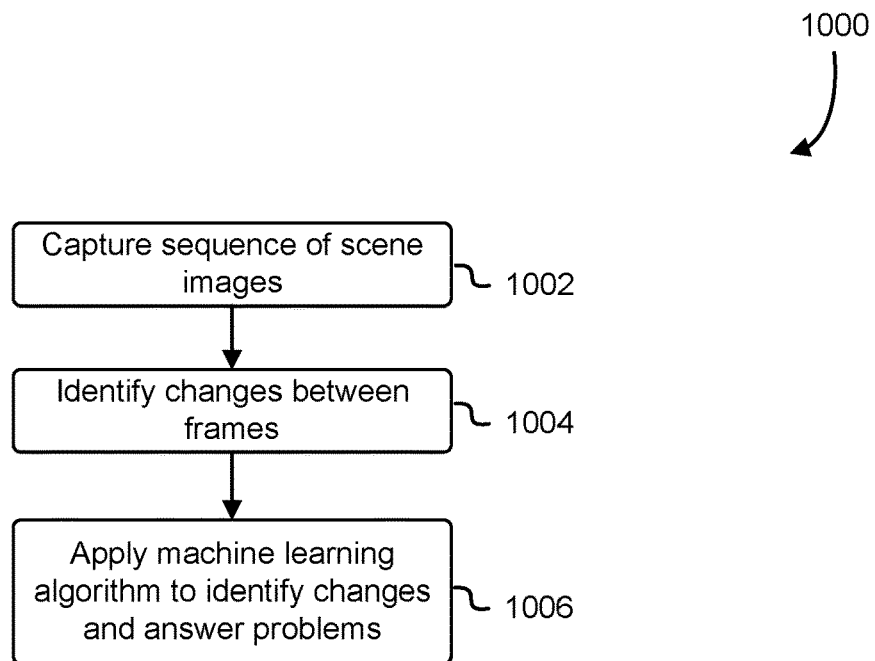
FIG. 10 is a flowchart illustrating aspects of identifying changes in an augmented reality scene, in accordance with an embodiment.

FIG. 10 is a flowchart illustrating aspects 1000 of identifying changes in an augmented reality scene, in accordance with an embodiment. Some or all of the process (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process may be performed by any suitable system, such as a server in a data center, by various components of the environments described herein, including FIG. 13, such as the one or more web servers 1306 or the one or more application servers 1308, by multiple computing devices in a distributed system of a computing resource service provider, or by any electronic client device such as the electronic client device 1302. The process includes a series of operations which, except where logically required (for example because the input to one step requires the output of a previous step, may be performed in an alternative order, or performed in parallel. In some embodiments, certain steps may be omitted.

In 1002, a sequence of scene images is captured. In 1004, changes between frames are identified. This may comprise converting scene images into a representation suitable for input to a neural network, or other classifier. For example, the sequence of image data might be converted to a differential representation.

In 1006, a machine learning technique, such as an artificial neural network or classifier, is applied to answer one or more problems related to the identified changes in the scenes. The problems answerable by application of the machine learning are varied. For example, a network may be trained to identify frames of image data with significant changes, such as a frame in which a person first enters into view, a frame in which a previously unrecognized object has appeared, and so forth. The output of the network can then be used to supply context information for the service negotiation.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 11:
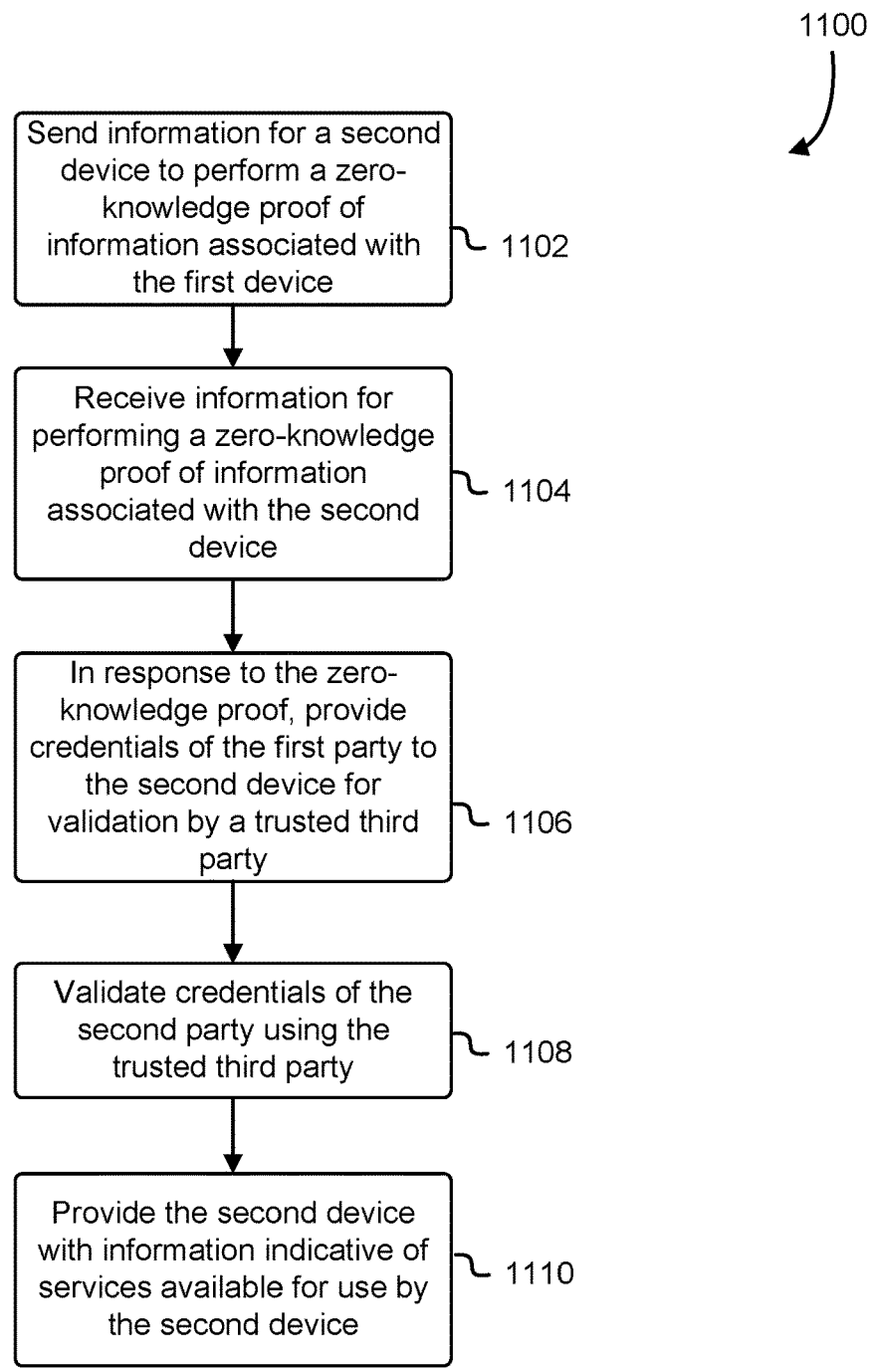
FIG. 11 is a flowchart illustrating an example process of service negotiation, in accordance with an embodiment.

FIG. 11 is a flowchart illustrating an example process 1100 of service negotiation, in accordance with an embodiment. Some or all of the process (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process may be performed by any suitable system, such as an augmented reality device, or by a server in a data center, by various components of the environments described herein, including FIG. 13, such as the one or more web servers 1306 or the one or more application servers 1308, by multiple computing devices in a distributed system of a computing resource service provider, or by any electronic client device such as the electronic client device 1302. Note that the following process is generally described, in the following description, in terms of actions taken by an augmented reality device. However, in various embodiments, some of the operations may be performed by an agent acting on behalf of the device. An agent process may, for example, operate on a server in a data center. Likewise, an agent process may perform the actions attributed below to the second augmented reality device.

The process includes a series of operations which, except where logically required (for example because the input to one step requires the output of a previous step, may be performed in an alternative order, or performed in parallel. In some embodiments, certain steps may be omitted.

At 1102, a first augmented reality device sends information for a second device to perform a zero-knowledge proof of information associated with the first augmented reality device. Examples of such information include, but are not necessarily limited to, information indicative of the device's support for the negotiation protocol, and information pertaining to the identity of an entity associated with the device.

The operation 1102 may occur in response to a request to initiate a negotiation process to the second device, where that request includes the information necessary for the second device to perform the zero-knowledge proof.

At 1104, the first device receives information for performing a zero-knowledge proof of a second entity associated with the second device. In an embodiment, the first device receives a request to perform the proof from the second device, sent by the second device after it verified the proof requested by the first device.

More generally, the operations 1102 and 1104 may comprise mutually performed proofs of information associated with the respective devices. In a negotiation process comprising a series of data exchanges with increasing sensitivity, these proofs act, in embodiments, as the initial exchange.

At 1106, the first device responds to completion of the zero knowledge proofs by providing the first entity's credentials to the second device. The second device may then use a third-party validation service to verify the first entity's credentials. Here, credentials may refer to information such as a user name and password, biometric information, or other information which uniquely identifies the first entity or otherwise permits the second device to determine a scope of access rights appropriate to the circumstances.

At 1108, the first device validates the second party's credentials, using the third-party verification service. The credentials are sent, by the second device, to the first device in response to the second device's completion of the zero-knowledge proof of the first entity.

At 1110, the first device provides the second device with information describing services that the first device is making available to the second device. These services are those that the second device is authorized to use. Note that the prior operations involving the zero-knowledge proofs and credential verification may not, by themselves, be determinative of the final set of access rights. The negotiation process may continue in a further series of exchanges, which may involve exchanges of data with escalating sensitivity, in order to establish further contextual information that influences the final set of available services. For example, a user's privacy settings might limit the final set of available services, but this might depend on context and the identity of the other user. Thus, establishing the set of available services may depend on some combination of rights granted by the respective credentials of the parties, the context of the situation or transaction, and the preferences of the user.

Accordingly, in embodiments, the services authorized for a device are those that conform to a mutually agreed level of sensitivity. Such mutual authorization, in embodiments, comprises an indication of consent to provide the information by one party, and consent to receive the information by the other party. This mutual authorization may, in embodiments, be performed via a series of data interchanges that occur after credentials have been verified at step 1108. For example, a first device might indicate that it has and is willing to provide medical information, to which the second device might respond that it is able to consume such information. Further exchanges might establish agreed-upon parameters for the exchange. Similarly, a first device might indicate that it is requesting sensitive information, while the second device might indicate that it is willing to provide such information, subject to certain conditions. Further exchanges might indicate what those conditions are, and whether they are agreed upon. Upon completion of these exchanges, a set of authorized services might then be mutually agreed upon.

In these and other embodiments, authorization of services may refer to those services which conform to a set of conditions.

In these and other embodiments, authorization of services may refer to those services which conform to contextual requirements. These requirements may include one or more of, but are not necessarily limited to, the time and place of the exchange, the identity of the entities involved, and the nature of a transaction being conducted or contemplated.

Figure 12:
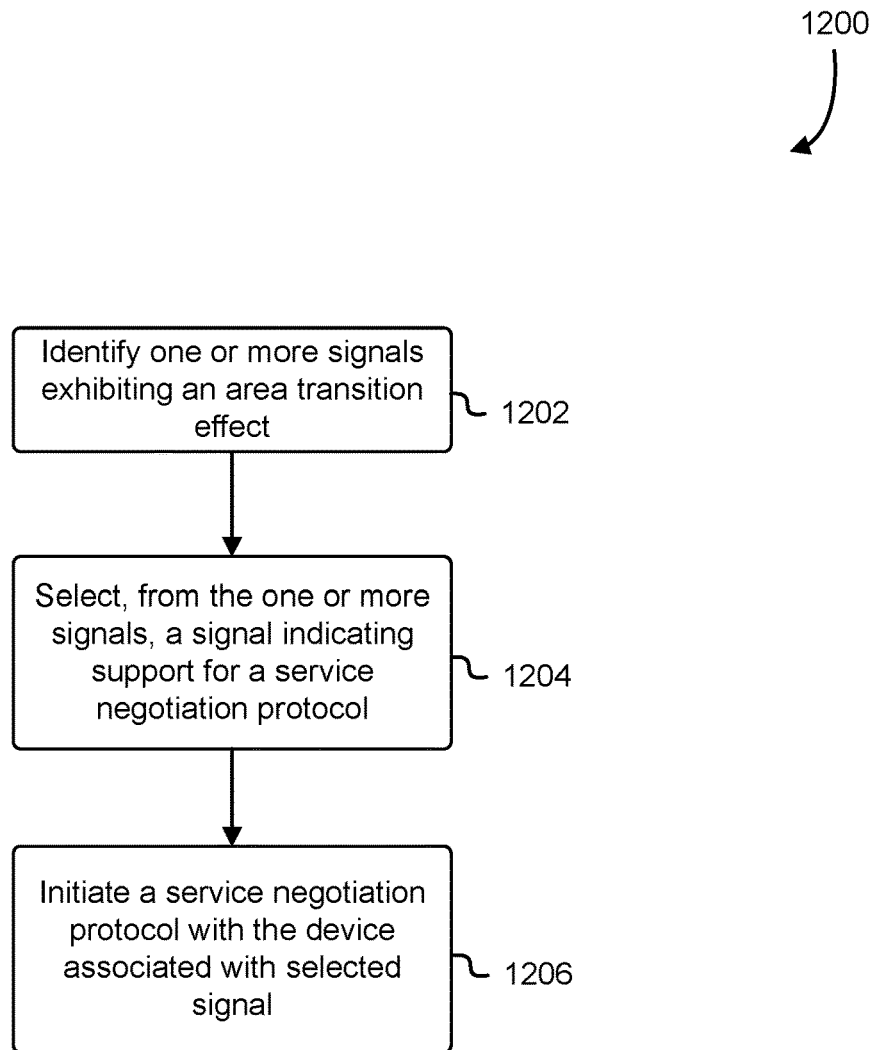
FIG. 12 is a flowchart illustrating an example process of identifying a signal for service negotiation, in accordance with an embodiment.

FIG. 12 is a flowchart illustrating an example process of identifying a signal for service negotiation, in accordance with an embodiment. Some or all of the process (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process may be performed by any suitable system, such as a server in a data center, by various components of the environments described herein, including FIG. 13, such as the one or more web servers 1306 or the one or more application servers 1308, by multiple computing devices in a distributed system of a computing resource service provider, or by any electronic client device such as the electronic client device 1302. The process includes a series of operations which, except where logically required (for example because the input to one step requires the output of a previous step, may be performed in an alternative order, or performed in parallel. In some embodiments, certain steps may be omitted.

The example process 1200 is employed, in embodiments, to determine when to initiate a service negotiation. As described herein, because there may be numerous signals within the environment, it may be difficult to efficiently identify those signals which represent potential service negotiation partners. The example process 1200 uses an analysis of the wireless signals to identify an area transition effect that may occur when a user of a device crosses a threshold, as might happen when that user enters a building.

At 1202, an augmented reality device identifies one or more signals that are exhibiting, or have exhibited, an area transition effect. An area transition effect refers to various modulations or changes to a wireless signal that may be observed as a device receiving those signals crosses a threshold. As described herein, these changes may be observed, in cases and embodiments, as a gradient in signal strength, such as an increase or decrease in signal strength. In other cases an embodiments, the area transition effect is observed as a change in the strength of the signal across portions of a spectrum. For example, certain portions of the spectrum occupied by a signal might become stronger, while other portions become weaker. Moreover, some patterns may be indicative of the corresponding device being carried into a room or building.

In embodiments, analysis of a plurality of signals in the ambient environment results in the selection of a subset of those signals, where the selected subset are those that have or are exhibiting the area transition effect. At 1204, the augmented reality device selects, from among the signals exhibiting the area transition effect, a signal which indicates that the device that is broadcasting the signal supports a service negotiation protocol. For example, the augmented reality device might analyze the content of each of these signals to determine which ones contain an indication that they support the service negotiation protocol. From these, a signal and its emitting device can be selected for engaging in a negotiation protocol. For convenience in description, this device can be referred to as the second device.

At 1206, the augmented reality device initiates a service negotiation protocol with the second device. The negotiation may proceed, in embodiments, according to the procedure depicted in in FIG. 11.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages, or information over an appropriate network 1304 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 1300 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 9. Thus, the depiction in FIG. 13 should be taken as being illustrative in nature and not limiting to the scope of the disclosure.

The network 1304 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1304 are well known and will not be discussed in detail. Communication over the network 1304 can be enabled by wired or wireless connections and combinations thereof. In an embodiment, the network 1304 includes the Internet and/or other publicly addressable communications network, as the environment 1300 includes one or more web servers 1306 for receiving requests and serving content in response thereto, although for other networks an alternative device serving a similar purpose could be used as would be apparent to one of ordinary skill in the art.

The illustrative environment 1300 includes one or more application servers 1308 and data storage 1310. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1308 can include any appropriate hardware, software and firmware for integrating with the data storage 1310 as needed to execute aspects of one or more applications for the electronic client device 1302, handling some or all of the data access and business logic for an application. The one or more application servers 1308 may provide access control services in cooperation with the data storage 1310 and is able to generate content including, text, graphics, audio, video, and/or other content usable to be provided to the user, which may be served to the user by the one or more web servers 1306 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 1302 may be processed by the electronic client device 1302 to provide the content in one or more forms including forms that are perceptible to the user audibly, visually, and/or through other senses. The handling of all requests and responses, as well as the delivery of content between the electronic client device 1302 and the one or more application servers 1308, can be handled by the one or more web servers 1306 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1310 can include several separate data tables, databases, data documents, dynamic data storage schemes, and/or other data storage mechanisms and media for storing data relating to a particular aspect of the present disclosure. For example, the data storage 910 may include mechanisms for storing various types of data and user information 1316, which can be used to serve content to the electronic client device 1302. The data storage 1310 also is shown to include a mechanism for storing log data, such as application logs, system logs, access logs, and/or various other event logs, which can be used for reporting, analysis, or other purposes. It should be understood that there can be many other aspects that may need to be stored in the data storage 1310, such as page image information and access rights information, which can be stored in any of the above listed mechanisms as appropriate or in additional mechanisms in the data storage 1310. The data storage 1310 is operable, through logic associated therewith, to receive instructions from the one or more application servers 1308 and obtain, update, or otherwise process data in response thereto. The one or more application servers 1308 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1308.

In one embodiment, a user, through a device operated by the user, can submit a search request for a match to a particular search term. In this embodiment, the data storage 1310 might access the user information to verify the identity of the user and obtain information about items of that type. The information then can be returned to the user, such as in a results listing on a web page that the user is able to view via a browser on the electronic client device 1302. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 1304. These devices also can include virtual devices such as virtual machines, hypervisors, and other virtual devices capable of communicating via the network 904.

Various embodiments of the present disclosure utilize the network 1304 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 904 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1306, the one or more web servers 1306 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 1300 can include a variety of data stores and other memory and storage media as discussed above. These can reside in a variety of locations, such as on a storage medium local to (and/or resident in) one or more of the computers or remote from any or all of the computers across the network 1304. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

Embodiments of the present disclosure may be further understood in view of the following clauses.

In various embodiments, a system, method, or non-transitory computer-readable medium performs, includes, or causes to be performed operations to negotiate available computing services, in accordance with the techniques disclosed herein.

In various embodiments, a system, method, or non-transitory computer-readable medium performs, includes, or causes to be performed operations to display face-associated data in an augmented reality display, in accordance with the techniques disclosed herein.

In various embodiments, a system, method, or non-transitory computer-readable medium performs, includes, or causes to be performed operations to identify differences in a sequence of image data and answer questions based on the identified differences.

What is claimed is:

1. A device, comprising:
    at least one processor; and
    a memory having stored thereon executable instructions that, in response to execution by the at least one processor, cause the device to:
        send, to a second device, a request to perform a zero-knowledge proof of a first entity;
        receive, from the second device, a request to perform a zero-knowledge proof of a second entity associated with the second device;
        provide, in response to the zero-knowledge proof of the second entity, the second device with access to a service for retrieving credentials of the first entity, wherein the second device retrieves the credentials via the service and causes the credentials to be validated by a third-party verification service;
        send, to the third-party verification service, a request to validate credentials of the second entity retrieved from a service provided by the second device;
        send, to the second device, in response to the zero-knowledge proof of the second entity and the validation of the credentials of the second entity, information indicative of a first one or more services authorized for use by the second device; and
        receive, from the second device, information indicative of a second one or more services of the second device authorized for use.

2. The device of claim 1, wherein the memory has stored thereon executable instructions that, in response to execution by the at least one processor, cause the device to:
    determine the services to authorize for use by the second device, the subset of services determined based at least in part on a data sensitivity level mutually agreed upon with the second device.

3. The device of claim 2, wherein the services to authorize are determined based at least in part on a location of at least one of the first entity or the second entity.

4. The device of claim 2, wherein the services to authorize are determined based at least in part on a transaction associated with at least one of the first entity or the second entity.

5. The device of claim 1, wherein the services to authorize comprise a service to customize an augmented reality experience of the first entity.

6. The device of claim 1, wherein zero-knowledge proof of the second entity comprises verification of a fact provided by the second entity.

7. A computer-implemented method, comprising:
    initiating, from a first device, a communication with a second device by providing, to the second device, information for a zero-knowledge proof of a first entity;
    receiving, from the second device, information for a zero-knowledge proof of a second entity associated with the second device;
    providing the second device with access to a service for retrieving credentials of the first entity, wherein the second device retrieves the credentials via the service and causes the credentials to be validated by a third-party verification service;
    validating, by the third-party verification service, credentials of the second entity retrieved from a service provided by the second device; and
    providing, to the second device, information indicative of services authorized for use by the second device.

8. The method of claim 7, further comprising:
    identifying services to authorize for use by the second device, based at least in part on a data sensitivity level mutually agreed upon with the second device.

9. The method of claim 8, wherein mutually agreeing on the data sensitivity level comprises a plurality of exchanges of information between the first and second device, wherein an earlier exchange, of the plurality of exchanges, consists of information less sensitive than information in a subsequent exchange of the plurality of exchanges.

10. The method of claim 8, further comprising:
    determining to make a service available to the second device based at least in part on a location of at least one of the first entity or the second entity.

11. The method of claim 8, further comprising:
    determining to make a service available to the second device based at least in part on a transaction associated with at least one of the first entity or the second entity.

12. The method of claim 7, wherein the services available to the second device comprise a service to customize an augmented reality experience of the first entity.

13. The method of claim 12, wherein the service to customize the augmented reality experience is invoked to cause a device associated with the first entity to display information associated with at least one of a current or pending transaction between the first entity and the second entity.

14. A non-transitory computer-readable storage medium having stored thereon executable instructions that, in response to being executed by one or more processors of a computing device, cause the computing device to at least:
    provide, from a first device to a second device, information for a zero-knowledge proof of a first entity;
    receive, from the second device, information for a zero-knowledge proof of a second entity associated with the second device;
    provide the second device with access to a service for retrieving credentials of the first entity, wherein the second device retrieves the credentials via the service and causes the credentials to be validated by a third-party verification service;
    validate, by the third-party verification service, credentials of the second entity retrieved from a service provided by the second device; and
    exchange, with the second device, information indicative of services authorized for use by the second device.

15. The non-transitory computer-readable storage medium of claim 14, having stored thereon further executable instructions that, in response to being executed by one or more processors of an augmented reality device, cause the computing device to at least:
    identify services to authorize, based at least in part on a data sensitivity level mutually agreed upon with the second device.

16. The non-transitory computer-readable storage medium of claim 15, wherein mutual agreement on the data sensitivity level is determined based at least in part on a plurality of exchanges of information between the first and second device, wherein an earlier exchange, of the plurality of exchanges, consists of information less sensitive than information in a subsequent exchange of the plurality of exchanges.

17. The non-transitory computer-readable storage medium of claim 14, wherein a service is authorized for use by the second device based, at least in part, on co-location of the first entity and the second entity.

18. The non-transitory computer-readable storage medium of claim 14, wherein a service is authorized for use by the second device based, at least in part, on a transaction associated with at least one of the first entity or the second entity.

19. The non-transitory computer-readable storage medium of claim 14, wherein the services authorized for use by the second device comprise a service to customize an augmented reality experience.

20. The non-transitory computer-readable storage medium of claim 14, having stored thereon further executable instructions that, in response to being executed by one or more processors of an augmented reality device, cause the computing device to at least:
  display, in response to an invocation of the service to customize an augmented reality experience, information associated with at least one of a current or pending transaction between the first entity and the second entity.

\* \* \* \* \*